No. 888,447. PATENTED MAY 19, 1908.
H. W. LEONARD.
CONTROLLING MEANS FOR ELECTRIC MOTORS.
APPLICATION FILED JULY 12, 1905.

Witnesses
S. R. Sager
M. Smollaus

H. Ward Leonard Inventor
By his Attorney
C. W. Edwards

UNITED STATES PATENT OFFICE.

HARRY WARD LEONARD, OF BRONXVILLE, NEW YORK.

CONTROLLING MEANS FOR ELECTRIC MOTORS.

No. 888,447.  Specification of Letters Patent.  Patented May 19, 1908.

Original application filed January 28, 1902, Serial No. 91,577. Divided and this application filed July 12, 1905.
Serial No. 269,330.

*To all whom it may concern:*

Be it known that I, HARRY WARD LEONARD, a citizen of United States, residing at Bronxville, in the county of Westchester and State of New York, have invented certain new and useful Improvements in Controlling Means for Electric Motors, of which the following is a full, clear, and exact specification.

My invention relates to the control of electric motors, and especially to the control of electromotive force applied thereto.

It is important to control the electromotive force applied, as by means of a rheostat, or by some other device external to the motor, in such a way that the motor will not be subjected to excessive currents and the strains upon the motor and device driven thereby, will be reduced to permissible limits and at the same time give a desired increase or decrease in the speed or reversal thereof. This may be accomplished by controlling the electromotive force applied to one element of the motor, as for example, the armature, or it may be accomplished by controlling to some degree the other element of the motor, as for example, the field, or a combination of the two methods may be used. In the latter case, there should be a functional protective relation between the two controlling means so that the proper operation of the devices will not depend upon the operator, that is, whether the two controlling means are operative manually or automatically, the relation between the two should be such that the operation takes place only and necessarily in such a manner that the parts will always be protected from improper operation.

My invention further relates to the automatic control of the motor by the movement of the device driven thereby, and to the variation of its speed and direction of rotation as may be desired in particular cases of application.

Figure 1:
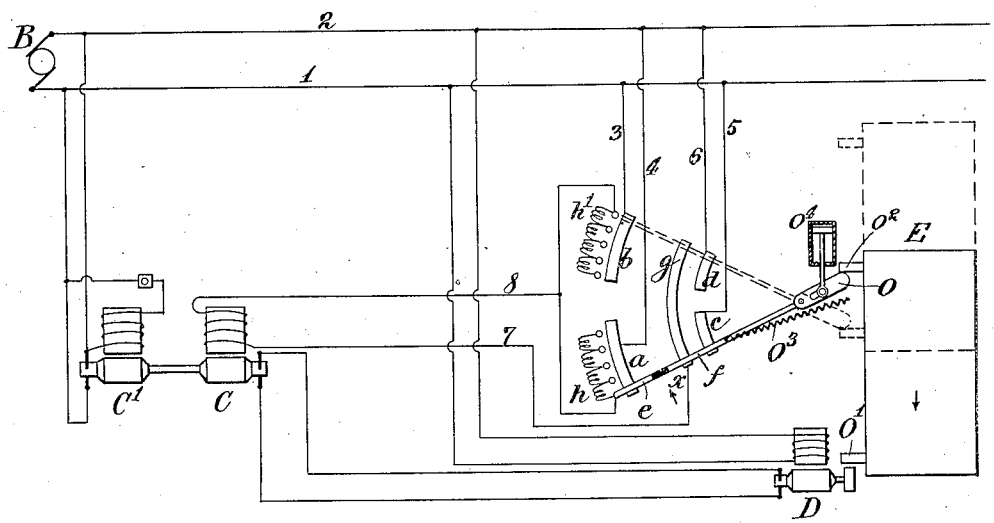
Figure 2:
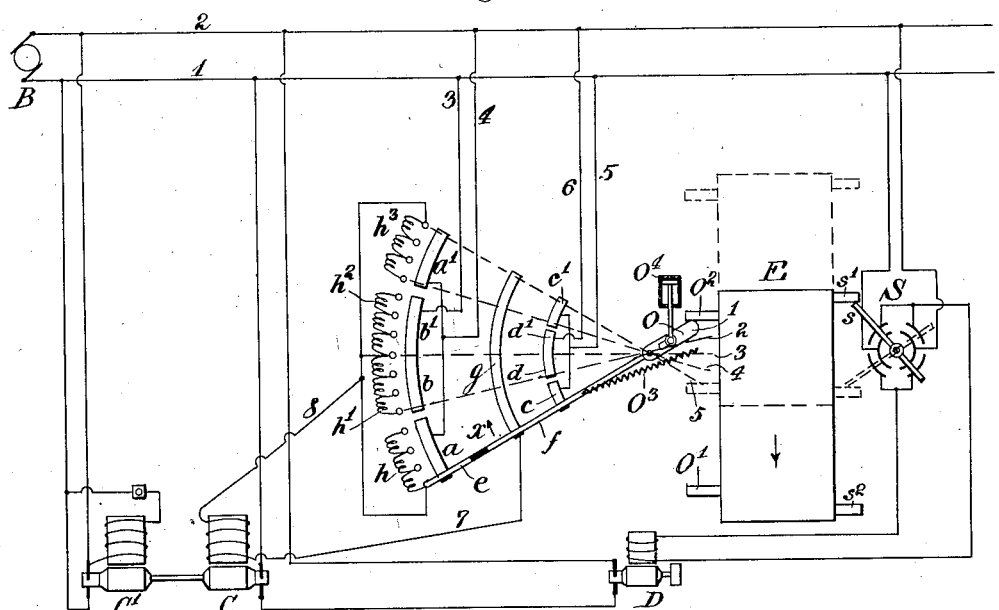

My invention will be understood by reference to the following description taken in connection with the accompanying drawings, in which Figure 1 is a diagrammatic view of one form of my invention; and Fig. 2 is a similar view of another form of my invention.

Referring to Fig. 1, B indicates a source of electric energy having a constant electromotive force and extending therefrom are the conductors 1, 2. An electric motor C' is shown connected across the mains 1, 2 of constant electromotive force and drives the dynamo electric machine C at a desired constant speed. It will be understood however, that any other suitable device might be used for driving the machine C at desired speeds. The dynamo C has a separately excited, variable and reversible field connected across the circuit 1, 2 through a reversing rheostat, the details of which will be hereinafter referred to. In circuit with the armature of the dynamo C is connected the armature of the motor D to be controlled. The field circuit of the working motor D is shown in this instance as connected across the conductors 1, 2, giving a practically constant field strength to the motor. Thus it will be seen that by connecting the armature of the working motor in circuit with the armature of the dynamo C, which has a variable and reversible electromotive force, the working motor may be operated at any speed desired, and since its field strength remains constant, its direction of rotation may be reversed by reversing the electromotive force of machine C.

The rheostat for controlling the field strength of the dynamo electric machine C, may be of any desirable form. As shown, it comprises contact plates $a$ and $b$, from which extend conductors 3 and 4 to the conductors 1, 2; contact plates $c$ and $d$ are also connected with conductors 1, 2 by the wires 5 and 6 respectively; a pivoted contact arm passes over these contact plates and carries two conducting portions $e$ and $f$ insulated from each other; a contact plate $g$ is connected by wire 7 to the field winding of the dynamo C and the resistance steps $h'$ are connected from their outer terminals by wire 8 to the remaining terminal of the field winding of the machine C. It will be seen that for the position shown in full lines there is no resistance in the field circuit of the dynamo C, and that the movement of the pivoted arm towards its central position will gradually increase the amount of resistance in the field circuit and weaken the field which will gradually reduce the electromotive force generated. When the arm is in the central position the field circuit is open and practically no electromotive force will be generated by the dynamo. When the arm moves beyond the central position the connections are such that the direction of current through the field winding is reversed and as the arm continues its movement the resistance $h'$ will be gradually cut out of circuit, giving a gradual increase in electromotive force of the dynamo in the reverse direction. When the arm is in the position indicated by the dotted lines, all of the resistance $h'$ will be cut out and the machine C will supply its maximum electromotive force in the reverse direction. A similar action takes place when the arm is moved back to the position shown in the full lines. In this illustration, the working motor D is indicated as driving the table E of a planing machine and in order to produce the reciprocating movement of the table, the direction of rotation of the motor armature is reversed by automatically reversing the field magnetism of the machine C. The pivoted arm of the rheostat is actuated by the engagement of the end $o$ of the arm with lugs $o'$, $o^2$ projecting from the table E. The rheostat arm or lever is provided with a spring $o^3$ which, when the lever is moved over the dead center by the movement of the table, throws the lever to the opposite position. The illustration indicates the table as moving in the direction of the arrow, and the the lug $o^2$ just engaging the end $o$ of the rheostat lever. This engagement takes place when the table has very nearly reached the end of its movement in one direction. As the table continues to move in the direction of the arrow, the contact lever is moved in the direction of the arrow $x$ and when it is carried over the central position the spring $o^3$ throws the lever to the dotted position. The field magnetism of the machine C being now reversed, the direction of rotation of the motor armature will be reversed and the table E will move in the opposite direction. When the table reaches the dotted position, the lug $o'$ will engage the lever $o$ and start the lever in the opposite direction, as will be understood. Thus the direction of rotation of the armature is automatically and periodically reversed to produce a reciprocating motion of the driven device. With this construction the speed of the armature is gradually reduced before being reversed and excessive strains and shocks are avoided. I have shown a dash-pot $o^4$ for retarding the movement of the rheostat lever when thrown by the spring so that the time required for fully reversing the switch can be varied as desired. The starting of the motor in the reverse direction will therefore also be gradual and without shock to the apparatus.

Fig. 2 illustrates the application of another system to the operation of tools or apparatus in which the driven part is moved alternately in opposite directions at desired speeds. The figure also shows control of the two elements of the working motor, the controlling means being functionally related so as to avoid improper operation thereof. As in Fig. 1 the machine C is driven by a motor C′, but the working motor D and the machine C have their armatures connected in series and across the line 1, 2. By varying and reversing the field of the dynamo C, the working motor may be operated at any speed desired from zero to a speed due to the sum of the electromotive forces of the machines B and C. That is to say, if the machines B and C are capable of generating the same electromotive force, and if both are producing the same electromotive force, then if the electromotive force of machine C is counter to that of machine B, the working motor will receive no energy and will remain at rest or if in motion will come to rest. Now if the field of machine C is weakened, thus reducing the electromotive force produced by that machine, the working motor will receive energy due to the difference between the electromotive forces of B and C. The energy so delivered to the working motor may be increased by decreasing the strength of the field of machine C until that machine is producing pratcially no electromotive force, and then by reversing the field of that machine, it will generate an electromotive force in the same direction as that of machine B, and the working motor will receive an electromotive force equal to the sum of the electromotive forces of machines B and C, and this electromotive force can be further increased by increasing the strength of the field of machine C, thus increasing the electromotive force produced thereby, and increasing the speed of the working motor, until the working motor receives the full electromotive forces of the machines B and C.

In the drawing, the controlling rheostat for machine C is shown as a double reversing rheostat, that is to say, the field connections of machine C are reversed twice in each operation from zero speed to high speed. For this purpose the rheostat shown is provided with an extra set of contact plates $a'$, $b'$ and $c'$, $d'$, and as shown in Fig. 2 contact plates $b$, $b'$ and $d$, $d'$ are made in one section. Similarly the resistance is double, section $h'$ being increased by adding a section $h^2$ of equal resistance and section $h$ being duplicated by a section $h^3$, having the same resistance as section $h$. The circuit connections are as follows: Contact plates $a$ and $a'$ are connected together and by wire 4 are connected to main conductor 2; plate $b$, $b'$ is conected by wire 3 to main conductor 1; contact plates $c$, $c'$ are connected together and by wire 5 are connected to main conductor 1; plate $d$, $d'$ is connected by wire 6 to main conductor 2; the field winding of machine C is connected by wire 7 to contact plate $g$ and by wire 8 to the resistance terminals of section $h$ and $h^3$ and to the central contact of resistance section $h'$, $h^2$. I also provide a reversing switch S for the field winding of working motor D, and the adjustment and inter-relation of the parts are such that the field of the motor is controlled only at a time when the controlling devices for the motor armature are in such position or condition that no harmful effects take place.

As shown, the working motor D is driving the part E at full speed in the direction of the arrow; that is, there is no resistance in the field circuit of the machine C and the electromotive force of that machine assists the electromotive force of machine D in driving the working motor. In the practical operation of automatically reversing machinery in this manner I prefer to so arrange the machine C that its electromotive force will be slightly less than that of the source, so that the line electromotive force cannot be balanced thereby and the machinery brought to rest by the operation of the automatic controlling mechanism. The movable part E in the illustration is just engaging the end o of the controlling lever f and the continued movement of E moves the lever f in the direction of arrow x, which effects a gradual weakening of the field of machine C by inserting resistance h while maintaining the line connections, until that machine produces practically no electromotive force and the speed of motor D will be that due to the line electromotive force only. When lever f reaches the dotted line position 2, the field connections of machine C are reversed with all the resistance of section $h'$ in circuit, and that machine will now produce a low electromotive force counter to that of the line, and the speed of the motor D will be further reduced. When lever f reaches the dotted line position 3, it will be on the central contact of resistance $h'$, $h^2$ which contact is connected with conductor 8 and hence all resistance will again be cut out of the field circuit of machine C and that machine will then produce its full electromotive force counter to that of the line, and the net electromotive force upon the terminals of motor D will be just about sufficient to carry E a slight distance forward to move lever f over the dead center, whereupon spring $o^3$ will continue the movement of lever f in the direction of the arrow, but this movement is retarded by the dashpot $o^4$. Simultaneously with the movement of lever f from position 1 to position 3, stud $s'$ moves lever s of reversing switch S, and when lever f is moved beyond position 3, lever s is simultaneously moved over its center line, thus reversing the line connections of the field of motor D. It will be noted that the reversal of motor D takes place when the electromotive forces upon its armature terminals is very low, due to the fact that while lever f is in position 3, machine C is producing its full electromotive force in opposition to that of the line. The reversal of switch S will cause the armature D to rotate in the opposite direction and as the lever s moves toward position 5, the armature will gradually run up to full speed. The movement of lever f beyond position 3 gradually weakens the field of C by inserting resistance section $h^2$ and when that section is all in, machine C will produce practically no electromotive force counter to that of the line. At position 4 the field connections of the machine C are reversed with all of resistance section $h^3$ in circuit, and machine C will now produce a low electromotive force in the same direction as that of the line and when position 5 is reached, machine C will produce its full electromotive force in the same direction as the line electromotive force, and the field magnetism of D being reversed, E will move at full speed toward the dotted line position. When lever f is in the dotted line position 5 and switch lever s is in its dotted line position, studs $o'$ and $s^2$ will strike their respective levers when table E reaches the dotted line position and the operation described may be repeated and E caused to again move in the direction of the arrow.

In either of the forms of the apparatus shown when the motor and machinery driven thereby are operating at full speed, the automatic reduction of the electromotive force in the armature circuit of the motor causes the counter volts of the motor to exceed the impressed electromotive force in the armature circuit, and consequently a braking current flows from the motor armature, now acting as a generator, so that the motor and its load are brought to rest without the necessity of mechanical brakes.

The present application is a division of my pending application Serial No. 91,577 filed January 28, 1902, which was divided from my original application, Serial No. 622,269, filed February 6, 1897, and which resulted in Patent No. 717,584, granted January 6, 1903.

It will be understood that my invention may be embodied in various forms of construction, and that I am limited only as indicated by the following claims.

Having thus described my invention, I declare that what I claim as new and desire to secure by Letters Patent, is,—

1. The combination of an electric motor having a field winding energized independently of the voltage upon its armature terminals, a driven device mechanically coupled thereto, and automatic means controlled by the movement of said driven device for varying the speed of the motor.

2. The combination of an electric motor having a field winding energized independently of the voltage upon its armature terminals, and means automatically controlled by the work performed for varying the speed of the motor and reversing the rotation thereof.

3. The combination of an electric motor, and automatic means for reversing the rotation of said motor while maintaining the connections of the motor armature circuit unchanged.

4. The combination of an electric motor, and automatic means for reversing the field magnetism in order to reverse the direction of rotation of the motor, while maintaining the connections of the motor armature circuit unchanged.

5. The combination of an electric motor, means for automatically reducing the net electromotive force generated in its armature circuit for retarding the motor, and means for automatically reversing its direction of rotation.

6. The combination of an electric motor having a field winding energized independently of the voltage upon its armature terminals, a driven device, and automatic means controlled by the movement of said driven device for reversing the direction of rotation of said motor.

7. The combination of an electric motor having a field winding energized independently of the voltage upon its armature terminals, a device driven thereby, and automatic means for accelerating and retarding the motor armature and for reversing its direction of rotation.

8. The combination of an electric motor having a field winding energized independently of the voltage upon its armature terminals, a device driven thereby, and automatic means actuated by the movement of said driven device for accelerating, retarding and reversing the direction of rotation of said motor.

9. The combination of a source having constant electromotive force, two supply conductors connected therewith, a branch circuit extending therefrom and including the field winding of an electric motor, a second branch circuit including the armature of said motor, means for varying the electromotive force upon the terminals of one of said motor windings for controlling the speed of the motor, and for reversing the current in the other winding of said motor for reversing its direction of rotation, and means for insuring the proper protective operation of said first named means.

10. The combination of two supply conductors having a constant electromotive force, a branch circuit extending therefrom including a field winding of an electric motor, a second branch circuit therefrom including the armature winding of said motor, and automatic means for varying the speed of said motor and for automatically reversing its direction of rotation.

11. The combination of two supply conductors having a constant electromotive force, a branch circuit extending therefrom including a field winding of an electric motor, a second branch circuit therefrom including the armature winding of said motor, a movable device for controlling one of said windings, a movable device for controlling the other of said windings, and means for functionally relating the operation of said two devices and for automatically controlling at least one of said devices independently of the speed of the motor.

12. The combination of two supply conductors having a constant electromotive force, a branch circuit extending therefrom including a field winding of an electric motor, a second branch circuit therefrom including the armature winding of said motor, means for controlling the speed of the motor in one of said circuits, means for reversing the rotation of the motor in the other of said circuits, said means being functionally related mechanically.

13. The combination of two supply conductors having a constant electromotive force, a branch circuit extending therefrom including the field winding of an electric motor, a second branch circuit therefrom including the armature winding of said motor, and mechanically protectively related means for controlling the said two circuits and for reversing the current in one of them.

14. The combination of constant electromotive force supply mains, an electric motor having a field winding and an armature winding in parallel with each other, a device driven by said motor, and means controlled by the movement of said driven device for affecting the current in said field winding.

15. In electric motor driven machinery, the combination with a moving member thereof, of an electric driving motor having a field winding energized independently of the voltage upon its armature terminals, and means controlled by the position of said member whereby said motor is controlled to alternate the direction of motion of said moving member.

16. In electric motor driven machinery, the combination with a moving member thereof, of an electric driving motor having a field winding energized independently of the voltage upon its armature terminals, and switching means adapted to be controlled by the position of said member whereby said motor is controlled to alternate the direction of motion of said moving member.

17. The combination of a source of constant electromotive force, a second source of electromotive force, an electric motor having one element thereof connected with said second source, a device driven by said motor, and means automatically controlled by the movement of said driven device for varying the electromotive force supplied by said second source.

18. The combination of a source of constant electromotive force, a second source of electromotive force, an electric motor having one element thereof connected with said second source, a device driven by said motor, and means automatically controlled by the movement of said driven device for varying and reversing the electromotive force supplied by said second source.

19. The combination of a source of constant electromotive force, a second source of electromotive force, an electric motor having its armature connected with said second source, a device driven by said motor, and means controlled by the movement of said driven device for varying the electromotive force supplied by said second source and for controlling the field circuit.

20. The combination of an electric motor, a device driven thereby, means controlled by the movement of said driven device for varying the electromotive force applied to the armature terminals of said motor and for affecting the field circuit.

21. The combination of a dynamo electric machine having a field winding energized by a current independent of its armature current, armature controlling means, field controlling means, said means being arranged to cause said machine to act as a generator and as a motor under different conditions, and means functionally relating the said controlling means to insure their proper operation.

22. The combination of a dynamo electric machine, a switch for affecting the armature, a switch in the field circuit, and a common actuating means for controlling said switches so as to cause said machine to act as a generator and as a motor under different conditions.

23. The combination of a source of constant electromotive force, a motor operated therefrom having a field winding energized by a current independent of its armature current, means for affecting the field circuit, means for affecting the armature circuit, said two means being functionally related mechanically and adapted to cause the operation of said motor as a generator and as a motor under different conditions.

24. The combination of an electric motor having its field and armature windings energized by currents independent of each other; independently movable means for reversing the current in one of said windings, independently movable means for controlling the current in the other of said windings, said two means being functionally related mechanically.

25. The combination of an electric motor, means for varying the net effective electromotive force applied to the motor armature without substantially changing the resistance of the armature circuit, means for reversing the field magnetism, and means insuring the reversal of the field magnetism only under conditions when the armature is protected against detrimental results.

26. The combination of an electric motor, means for controlling the electromotive force upon the armature terminals, means for reversing the field magnetism, and means for insuring the reversal of the field magnetism only when the electromotive force upon the armature terminals is so low as to avoid detrimental results and for causing said motor to act as a generator and generate useful energy at times.

27. The combination of an electric motor, means for reversing the current in one element thereof, means for controlling the current in the other element thereof, said two means being protectively functionally related and the latter of said two means being independent of rheostatic devices in the motor circuit.

28. The combination of a source of constant electro-motive force, means for deriving an electro-motive force therefrom, an electric motor having one element thereof connected with said means, a device driven by said motor, and means automatically controlled by the movement of said driven device for controlling the electro-motive force supplied to said element.

29. The combination of a source of constant electro-motive force, means for deriving an electro-motive force therefrom, an electric motor having one element thereof connected with said means, a device driven by said motor, and means automatically controlled by the movement of said driven device for reversing the electro-motive force supplied to said element.

30. The combination of a source of constant electro-motive force, means for deriving an electro-motive force therefrom, an electric motor having one element thereof connected with said means, a device driven by said motor, and means automatically controlled by the movement of said driven device for reducing and increasing the electromotive force supplied to said element.

31. The combination of a source of electric energy, means for deriving therefrom by magnetic induction a variable electro-motive force, an electric motor whose armature is supplied with energy controlled by the variable electro-motive force derived, a device driven by said motor, and means dependent upon the movement of said driven device for controlling the electro-motive force derived.

32. The combination of an electric circuit, means for reversing the current in said circuit, a second electric circuit, and means for reversing the current in said second circuit, the said two means being protectively functionally related as to their relative movements under certain conditions.

33. The combination of an electric motor, a device in series with the armature of said motor adapted to produce a variable electromotive force, a driven device, means for varying the electromotive force of said first named device for the purpose of controlling the speed of the motor and for automatically bringing the motor to rest by automatically controlling the effective electromotive force on the motor armature by the movement of said driven device.

34. The combination of an electric motor, a device in series with the armature of said motor adapted to produce a variable electromotive force, a driven device, means for varying the electromotive force of said first named device for the purpose of controlling the speed of the motor and for automatically bringing the motor to rest by automatically controlling the effective electromotive force in the motor armature circuit by the movement of said driven device.

35. The combination of an electric motor, a device driven by the armature thereof, a device producing an electromotive force by magnetic induction in series with the motor armature, and means controlled by the movement of the driven device for automatically varying the magnetically induced electromotive force and thereby automatically reducing the speed of the motor.

36. The combination of an electric motor having a driving element, a device driven thereby, a device adapted to produce an electromotive force by magnetic induction and having a winding in series with at least one element of the motor, and means controlled by the movement of the driven device for automatically controlling the electromotive force applied to said last named motor element and thereby retarding the speed of said driving element and driven device.

37. The combination of an electric motor, a device in series with the armature of said motor adapted to produce a variable electromotive force, a driven device, means for varying the electromotive force of said first named device for the purpose of controlling the speed of the motor and for automatically accelerating the motor by automatically controlling the effective electromotive force on the motor armature by the movement of said driven device.

38. The combination of an electric motor, a device driven by the armature thereof, a device producing an electromotive force by magnetic induction in series with the motor armature, and means controlled by the movement of the driven device for automatically varying the magnetically induced electromotive force and thereby automatically accelerating the motor.

39. The combination of an electric motor having a driving element, a device driven thereby, a device adapted to produce an electromotive force by magnetic induction and having a winding in series with at least one element of the motor, and means controlled by the movement of the driven device for automatically controlling the electromotive force applied to said last named motor element and thereby accelerating the said driving element and driven device.

40. The combination of an electric motor, a device driven by the armature thereof, a device producing an electromotive force by magnetic induction in series with the motor armature, and means controlled by the movement of the driven device for automatically varying the magnetically induced electromotive force and thereby automatically retarding and accelerating the motor.

41. The combination of an electric motor having a driving element, a device driven thereby, a device adapted to produce an electromotive force by magnetic induction and having a winding in series with at least one element of the motor, and means controlled by the movement of the driven device for automatically controlling the electromotive force applied to said last named motor element and thereby retarding and accelerating said driving element and driven device.

42. The combination of an electric motor, a device driven by the armature of said motor, a dynamo electric machine whose armature is in series with the motor armature, a field winding for said machine, and means controlled by said device for automatically reducing the current in said field winding.

43. The combination of an electric motor, a device driven by the armature of said motor, a dynamo electric machine whose armature is in series with the motor armature, a field winding for said machine, and means controlled by said device for automatically increasing the current in said field winding.

44. The combination of a source of electric energy, electromagnetic means supplied with energy therefrom and adapted to supply different electromotive forces, an electric motor, one element of said motor being controlled by energy supplied at different electromotive forces from said means, a device driven by said motor, and means controlled by the movement of said driven device for controlling the electromotive force supplied by said first named means.

45. The combination of a source of electric energy, a revolving energy transforming device supplied with energy therefrom and having a winding adapted to supply different electromotive forces, an electric motor having its armature in series with said winding, a device driven by said motor armature, and means controlled by the movement of said driven device for controlling the electromotive force supplied by said winding.

46. The combination of a source of constant electromotive force, means for deriving an electromotive force therefrom, an electric motor having one element thereof connected with said means, a device driven by said motor, and means automatically controlled by the movement of said driven device for causing said motor to act as a generator and thereby retard the driven device.

47. The combination of a source of electric energy, means for deriving therefrom by magnetic induction a variable electromotive force, an electric motor whose armature is supplied with energy controlled by the variable electromotive force derived, a device driven by said motor, and means dependent upon the movement of said driven device for causing said motor to act as a generator and generate a braking current.

In testimony whereof I affixed my signature in the presence of two witnesses.

H. WARD LEONARD.

Witnesses:
L. R. SAGER,
GEO. A. HOFFMAN.

---

Correction in Letters Patent No. 888,447.

It is hereby certified that in Letters Patent No. 888,447, granted May 19, 1908, upon the application of Harry Ward Leonard, of Bronxville, New York, for an improvement in "Controlling Means for Electric Motors," an error appears in the printed specification requiring correction, as follows: In line 5 of heading the word "Original" should be stricken out and the following words and figures inserted: *Original application filed February 6, 1897, Serial No. 622,269. Divided and;* and that the said Letters Patent should be read with this correction therein that the same may conform to the record of the case in the Patent Office.

Signed and sealed this 30th day of June, A. D., 1908.

[SEAL.]

C. C. BILLINGS,
*Acting Commissioner of Patents.*